May 8, 1962

J. S. BURNETT ET AL 3,033,353

CONVEYOR DRIVE APPARATUS

Filed Jan. 23, 1961

INVENTORS
John S. Burnett &
BY Glenn C. Reinhold
Irons, Birch, Swindler & McKie
ATTORNEYS INVENTORS
John S. Burnett &
BY Glenn C. Reinhold
Irons, Birch, Swindler & McKie
ATTORNEYS

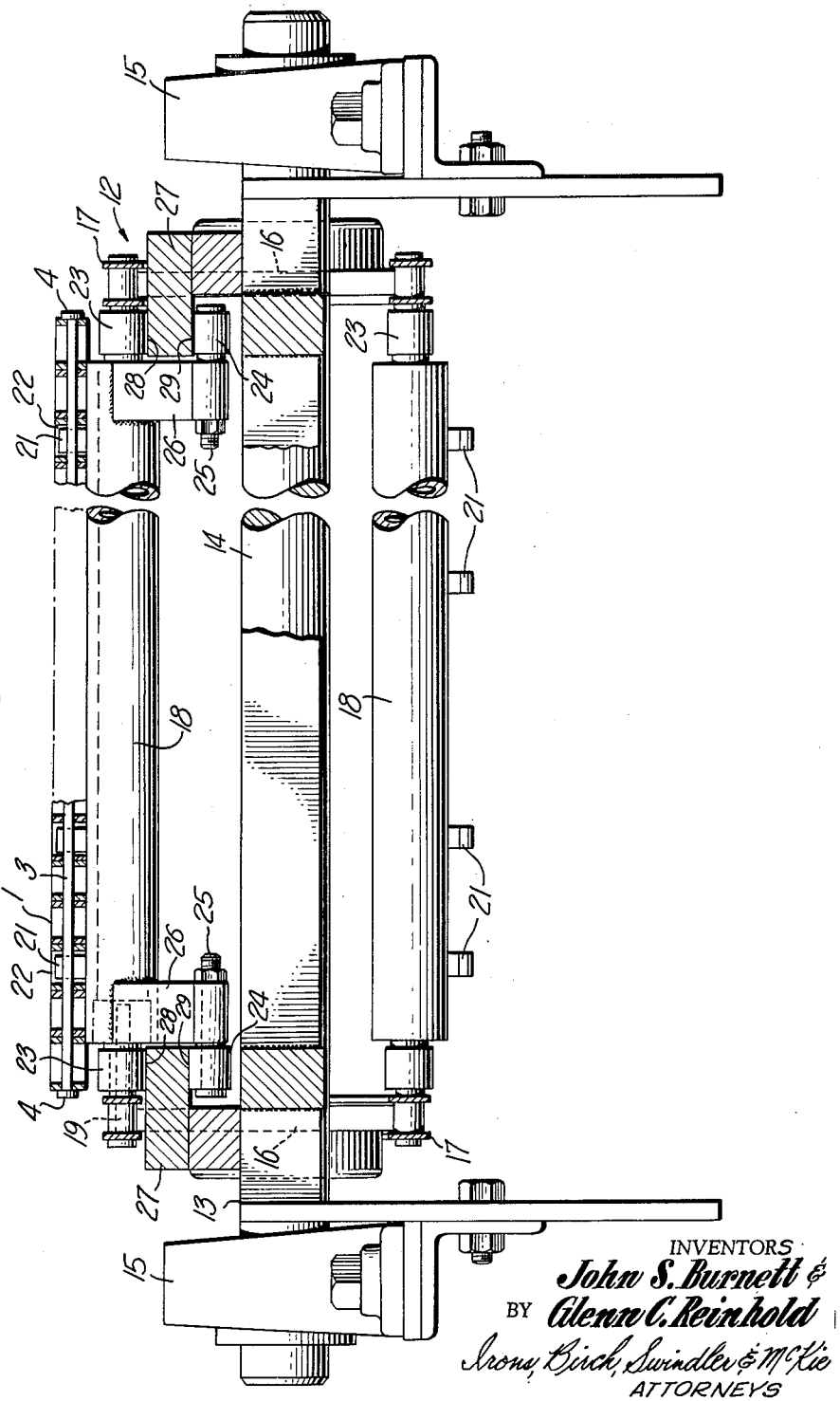

3,033,353
CONVEYOR DRIVE APPARATUS
John S. Burnett, Front Royal, and Glenn C. Reinhold, Winchester, Va., assignors to Ashworth Bros., Inc., Fall River, Mass., a corporation of Massachusetts
Filed Jan. 23, 1961, Ser. No. 84,290
11 Claims. (Cl. 198—203)

This invention relates to conveyors and more particularly to apparatus for driving conveyors moving along a straight run.

Conveyor belts comprising a flexible mesh fabric of metal or similar material are presently in wide commercial usage. Commonly such conveyor belts are disposed in endless fashion with oppositely moving upper and lower runs with driving being accomplished by sprockets engaging the belt as it moves from one run to the other around a vertical curve. There are various circumstances, however, where it is desirable to drive such conveyors at a location along a straight run. For example, the entire belt may move in a single plane, such as a horizontal plane, making driving along a straight run mandatory. Such belts are constructed to pass around lateral curves as disclosed, for example, in Bechtel Patent 2,872,023. Moreover, where conveyor belts have very long straight runs, one or more booster drives along the run may be desirable.

Certain problems are inherent in the driving of conveyors of the character described along a straight run. Circular sprockets are completely unsatisfactory. Driving teeth which engage the belt desirably should move along the same path as the belt. Such teeth should be moved into and out of driving contact with the belt with a minimum of friction and in such a manner as to insure smooth transfer of the load to succeeding teeth. Various types of endless drives commonly termed caterpillar drives heretofore have been employed to propel a horizontally moving elongated element. None of them have been found to be completely satisfactory for use in connection with a metallic mesh conveyor belt of the character described.

A primary object of the present invention is to provide an improved conveyor drive apparatus wherein a wide flat openwork conveyor may be smoothly and effectively driven while it is moving in a straight line past the driving location.

A further object of the invention is to provide such an apparatus wherein friction and wear of the driving surfaces is minimized.

Another object of the invention is to provide such an apparatus wherein driving is always accomplished at the same location along a straight run of the belt and smooth transfer is effected from one set of driving teeth to another regardless of slight variations in the pitch of the drive surfaces of the belt.

In general, the invention is directed to a conveyor drive apparatus comprising in combination a wide flat conveyor movable in a straight line past a location at which it is driven and having an openwork configuration with longitudinally spaced rows of transversely spaced pockets providing drive surfaces and an improved caterpillar type drive mechanism particularly adapted to propel the said conveyor. The drive mechanism includes endless drive chain means mounted at the driving location and having a straight upper run codirectional with the conveyor. Means such as sprockets to drive the endless chain means are also provided. A number of elongated rods are connected to the chain means for pivotal movement about their own axes. Such rods extend transversely of the conveyor at positions spaced longitudinally of the conveyor. A plurality of rods is always positioned along the straight upper run of the chain means. A plurality of pusher dogs are connected to each of the rods. Such dogs are spaced along each rod and between adjoining rods to correspond generally with the spacing between the pockets in the conveyor. The dogs are smaller in size longitudinally of the conveyor than the pockets and extend outwardly from the rods for movement by the chain means upwardly into the pockets of the conveyor for travel therein along the upper run of the chain means and then downwardly out of said pockets. Cam follower means are connected to the rods and cam means are mounted adjacent the upper run of the chain means to engage said cam follower means to control the vertical and pivotal movement of the rods. The cam means includes a surface configuration to hold each rod in a rearwardly rotated position with its lugs out of engagement with the corresponding drive surfaces of the conveyor while entering and leaving the pockets in the conveyor. The cam means has a further surface configuration to positively hold only one of the rods at a time in a forwardly rotated driving position with its dogs in driving engagement with their corresponding drive surfaces as such one rod passes a particular length along the upper run of the chain means and to release the rods on both sides of said one rod for rearward rotation away from driving position so that the conveyor is driven along the upper run of the chain means only at said particular length normally by the dogs of only one rod regardless of slight variations in the pitch of said drive surfaces. The cam means gradually releases the driving rod for rearward rotation at the after end of said particular length as the next succeeding rod reaches said particular length to effect smooth transfer of driving to such next succeeding rod.

The invention having been generally described, a preferred specific embodiment will now be set forth in detail with reference to the accompanying drawing in which:

FIGURE 4 is a vertical section taken along the line 4—4 of FIGURE 3.

Figure 1:
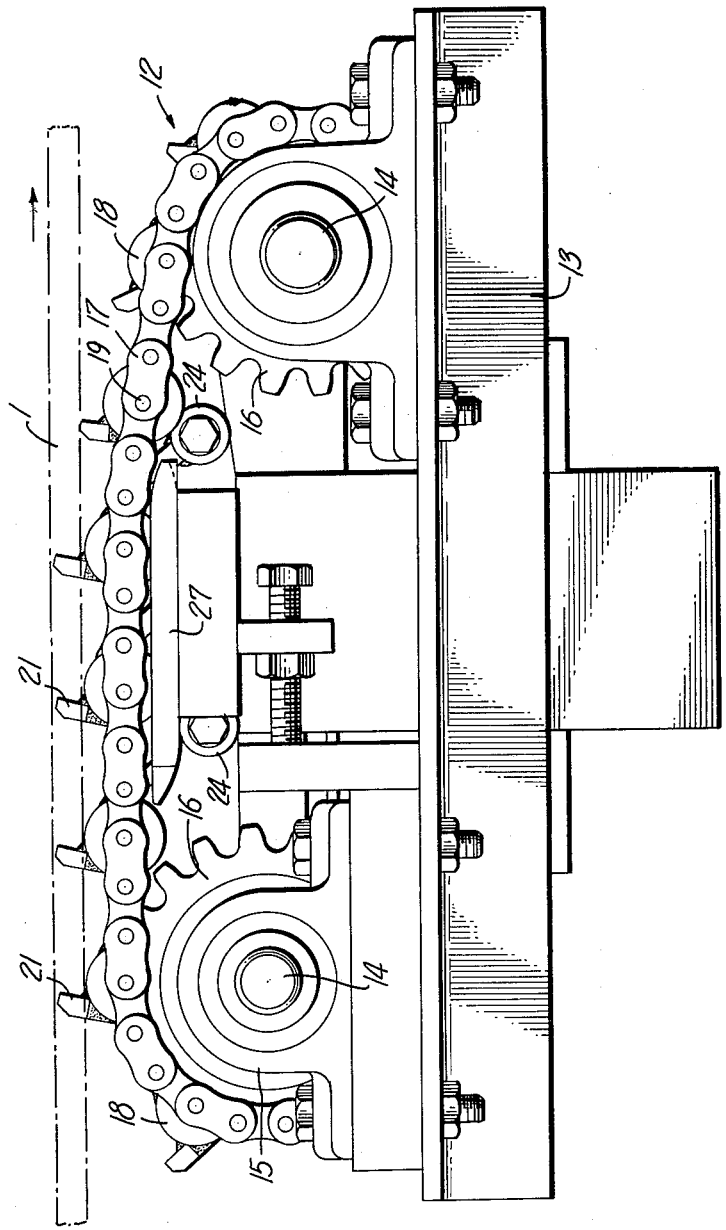
FIGURE 1 is a side elevation of a conveyor drive apparatus according to the invention.
Figure 2:
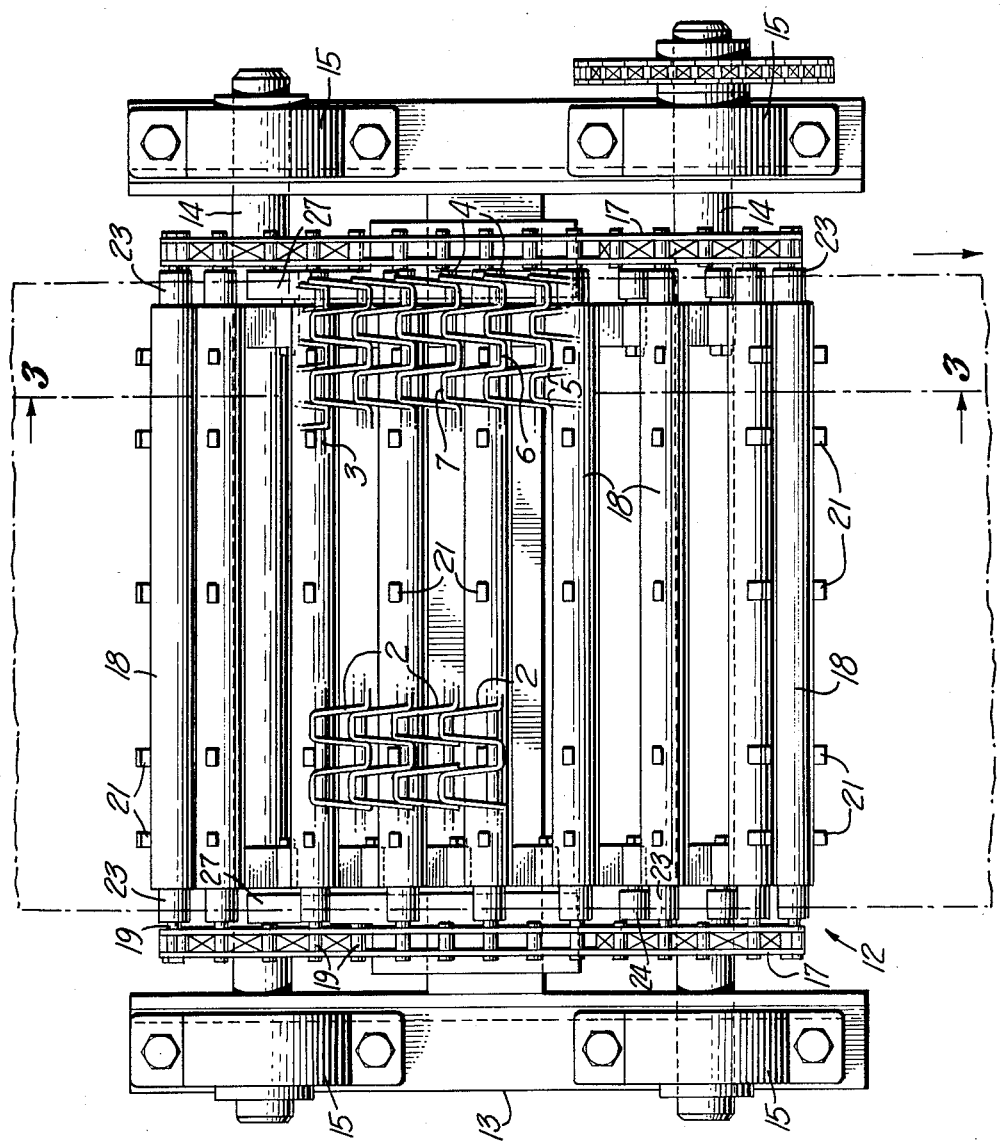
FIGURE 2 is a top plan view of such apparatus.

Shown in FIGURE 1 is a conveyor belt 1 formed of a flexible mesh fabric preferably of metal but alternatively of any suitable material. The belt 1 comprises a plurality of tractive links 2 (FIGURE 2) pivoted together by tractive cross pins 3 which are circular in cross section and held against transverse displacement by enlarged heads 4. Each link 2 is fabricated of a single piece of flat wire which is formed in a series of loops or bends to provide a plurality of elongated spaced apart wire members 5 which extend in the general direction of the movement of the belt. The members 5 are alternately inclined leftwise and rightwise from the longitudinal axis of the belt and are connected at alternate ends by end portions 6 and 7 respectively. Thus each pair of adjacent members 5 form a wedge shaped structure with the members connected across the narrow end of the wedge. The wedge shaped structures of adjacent links are staggered so that upon longitudinal collapse of the belt adjacent links are nested within each other. The belt may be longitudinally collapsible as disclosed, for example, in Bechtel Patent 2,872,023, to enable the conveyor to travel smoothly around lateral curves.

The conveyor 1 may be mounted on any conventional track which enables it to bear a load as it travels in a straight line. The conveyor is movable along a straight run past a location at which it is driven. The straight run may be horizontal or inclined. The specific embodiment illustrated in the drawings is shown in position to drive a horizontal run. Mounted at the driving location is a drive mechanism 12 which is supported on a suitable frame 13. The specific construction of the frame 13 forms no part of the present invention and it is shown and described only to the extent necessary and desirable to a complete understanding of the invention. Supported on the frame 13 are a pair of axles 14 which extend below the conveyor 1 and transverse thereto at positions spaced longitudinally of the conveyor. The axles 14 are journaled in bearings 15 which in turn are supported by the frame 13 by any suitable mountings. A pair of spaced sprockets 16 are mounted on each of the axles 14 at positions laterally outside of the conveyor 1. The sprockets 16 form drive means for a pair of endless chains 17 which are driven along an endless path by the sprockets which in turn are powered by any suitable motor (not shown). More than two sprockets and chains may be employed if desired. Further the sprockets and chains may be inside of the edges of the conveyor. Each chain 17 has an upper run which is codirectional with and spaced below the conveyor 1. A substantial number of rods 18 are connected to the chains 17 by pins 19 to permit the rods to be pivoted about their own axes. The rods 18 extend transversely of the conveyor at positions spaced longitudinally of the conveyor. The rods 18 are sufficiently closely spaced at uniform intervals around the chains 17 so that a plurality of the rods is always positioned along the upper run of the chains. Attached to each rod 18 as by welding are a plurality of pusher dogs 21 at spaced locations along the length of the rod. The pusher dogs extend outwardly from the rods for movement by the chains upwardly into mesh with the conveyor 1 at the beginning of the upper run of the chains. The openwork configuration of the conveyor 1 results in longitudinally spaced rows of transversely spaced pockets 22. The front of each of the pockets is defined by the curved rear surface of the round tractive pins 3. While circular or round pins are preferred, pins of other cross sections may be employed. Such curved rear surfaces of the pins provide drive surfaces which are engaged by the forward driving surfaces of the dogs 21. The pusher dogs are spaced along each rod and between adjoining rods to correspond generally with the spacing between the pockets 22. Such dogs are smaller in size longitudinally of the conveyor than the pockets and as the chain moves along its upper run the dogs are moved upwardly into the pockets for travel therein along such upper run driving the conveyor before them and then the dogs drop downwardly out of the pockets at the end of the upper run of the chain. The length of the rods 18 and the number of dogs 21 may be varied depending on the width of the conveyor 1 and the driving force required. Any desired width may be employed.

Figure 3:
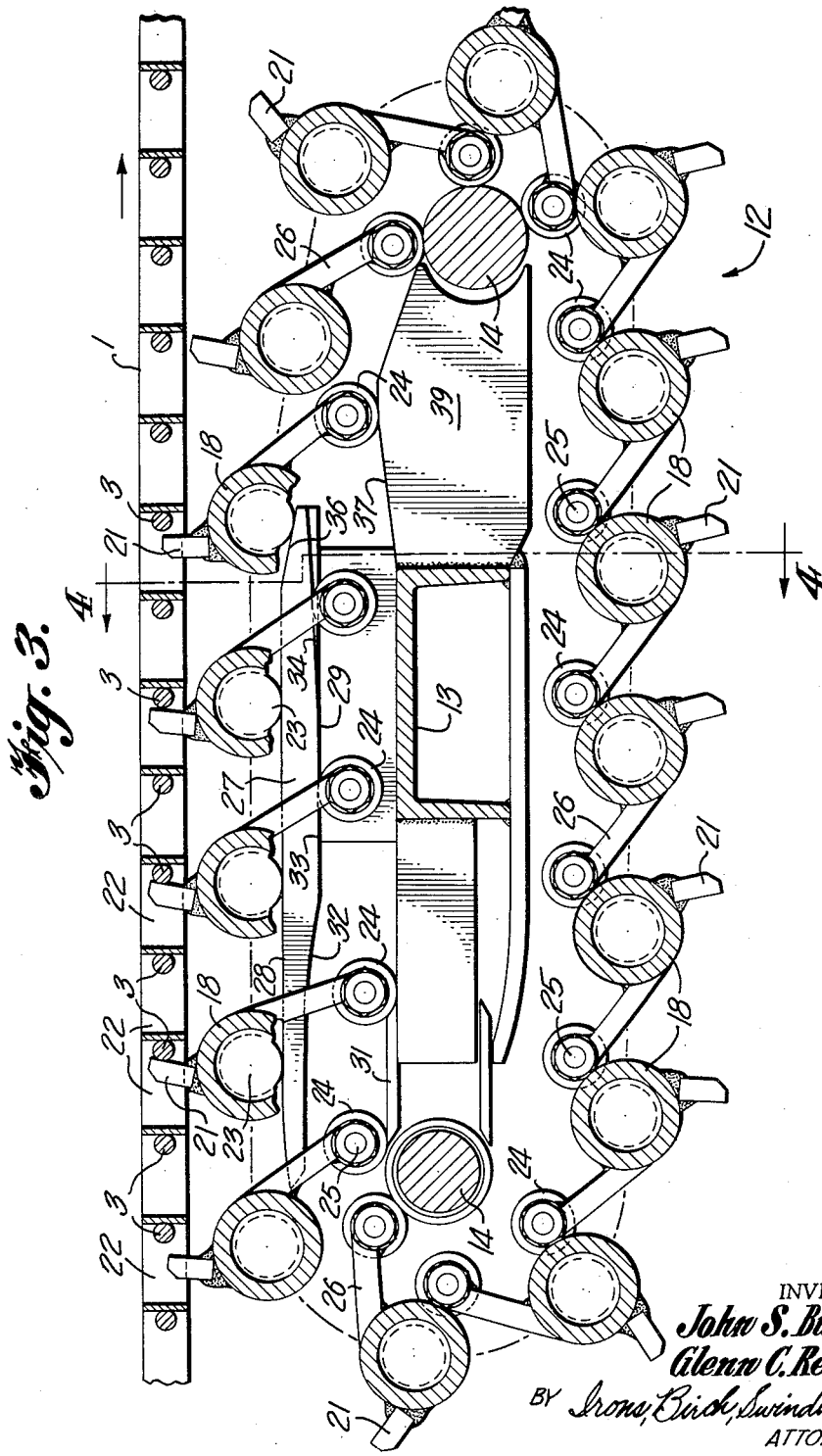
FIGURE 3 is a vertical section taken along the line 3—3 of FIGURE 2.

At each end of each of the rods 18 is mounted a cam follower roller 23 which is pivotable around the pin 19 coaxial with the rod 18. A second cam follower roller 24 is connected to each end of each rod 18. The roller 24 is pivotable about a pin 25 which connects the roller to a link 26 which in turn is rigidly connected to the rod 18 as by welding. Thus, the roller 24 may be moved to pivot the rod 18 about the roller 23. As shown in FIGURE 3, the link 26 holds the cam follower roller 24 at a position spaced below and forwardly of the cam follower roller 23 as the rods 18 are moved along the upper run of the chains. As best seen in FIGURE 4, the paths of movement of the rollers 23 and 24 lie in the same vertical plane.

An elongated plate 27 is supported by the frame 13 at a fixed position parallel to the conveyor run. The top and bottom faces of the plate 27 provide cam surfaces 28 and 29 engageable with the cam follower rollers 23 and 24, respectively, making a simple, compact construction. The upper cam surface 28 is parallel to the conveyor run, in this case horizontal, with downwardly tapered portions at each end thereof. When the rods 18 approach the straight upper run of the chains, the cam follower rollers 23 are moved on top of the cam surface 28 and ride therealong during the straight upper run. The cam surface 28 supports the rods 18 through the rollers 23 in elevated positions with the dogs 21 in the pockets 22.

As the rods 18 move upwardly around the rear sprocket 16 preparatory to entering the straight upper run of the chain, the cam follower roller 24 rides around the axle 14 and engages an upwardly facing cam surface 31 provided by a rigid element connected to the frame 13. The cam surface 31 engages the roller 24 to hold its rod 18 in a rearwardly rotated position with its dogs 21 out of engagement with the corresponding drive surface of the pin 3 while the dogs enter the pockets 22. As the rollers 23 ride up the inclined forward end of the cam surface 28, the dogs of the associated rods 18 remain out of contact with the pins 3 until the roller 24 drops off of the after end of the cam surface 31. At this point, the rod 18 is free to rotate forwardly so that the dog 21 falls forwardly against its associated pin 3. There is no driving relationship between the dog and the pin at this point, however, because the dog 21 is free to rotate rearwardly to relieve any pressure that may be exerted against it by the tractive pin 3. Such freedom to rotate rearwardly results from an upwardly relieved portion 32 at the forward end of the cam surface 29. As the rod 18 moves further along the horizontal upper run of the chain 17, the load of driving the conveyor is transferred to its dogs 21 when the associated roller 24 reaches the straight portion 33 of the cam surface 29. Along the particular length of the cam surface 29 where such surface is straight and parallel to the conveyor 1 the cam follower 24 engages such straight length to prevent any further rearward rotation of the rod 18 thereby causing its dogs 21 to assume the burden of driving the conveyor. Normally, only one cam follower roller 24 is engaged by the surface 33 at a time. Thus, the rod 18 attached to the roller 24 which is traversing the surface 33 normally is the sole driving rod. When the driving rod moves forward until its cam follower 24 reaches the end of the straight surface 33 where the cam surface 29 is relieved upwardly at 34, rearward rotation of the rod 18 is effected. At the same time the next succeeding roller 21 has its cam follower 24 reaching the beginning of the straight surface 33 so that the driving load is gradually transferred to such next succeeding roller as the cam follower 24 of the predecessor drive roller passes upwardly along the inclined surface 34.

Preferably the dogs 21 on each rod 18 have their drive surfaces located at or rearwardly of the vertical center line of the rod. This facilitates a smooth direct exit of the dogs from the pockets 22.

It can readily be seen that the load is smoothly transferred from rod to rod as the chains 17 move endlessly around their supporting sprockets. Moreover, the load normally is carried by the lugs of only one rod at a time, the adjacent rods being relieved of their load. There are necessarily two drive rollers, however, at the instant of transfer of the load. The driving rod is always at the same position longitudinally of the belt as its cam roller traverses the straight surface 33. Such position of the driving rod remains the same regardless of slight variations in the pitch of the tractive pins 3 above or below the pitch of the dogs. That pitch may change for various reasons such as manufacturing variations, temperature changes, wear of the belt, stretching of the belt and the like.

As shown in FIGURE 3, the straight cam surface 33 is so positioned relative to the cam follower rollers 24 that the forward driving surface of each of the dogs 21 is maintained in a forwardly inclined position, preferably about ten degrees from the vertical, as it engages the drive surface of the pin 3. Thus, the dogs tend to cam the conveyor belt downwardly to restrain separation of the conveyor from the dogs which in most operations eliminates the necessity for extraneous holddown devices to maintain the conveyor in engagement with the driving mechanism.

When the rod 18 which has been relieved of its driving load nears the after end of the member 27, the cam follower roller 23 reaches the downwardly relieved after end 36 of the cam surface 28. Thus, the dogs 21 on such rod are lowered out of their corresponding pockets. At the same time an upwardly facing cam surface 37, which is provided by a member 39 connected to the frame 13, engages roller 24. The cam surface 37 is inclined upwardly so that as the roller 24 rides up on the surface 37, the associated rod 18 is rotated rearwardly to move its dogs 21 rearwardly away from their corresponding tractive pins 3. The cam surface 37 retains the dogs 21 out of contact with the pins 3 until such dogs have dropped completely out of the pockets 22. The maintaining of the dogs out of contact with their respective driving surfaces during entry into and departure out of the conveyor pockets precludes sliding friction thereby minimizing wear of both the dogs and the belt and reducing the load necessary to drive the chains 17.

The rods 20 are then carried around the forward sprocket 16 and along the straight lower run of the chains 17 until they reach the rear sprocket 16 to begin another driving cycle.

Normally two sets of the cam surfaces shown and described are employed, one on each side of the conveyor. Where conveyors of great width are used, however, one or more intermediate sets of cam surfaces may be added.

There has been illustrated and described what is considered to be a preferred embodiment of the invention. Certain alternative features have been suggested but no attempt has been made to list all possible modifications. It will be understood that various other modifications from the specific embodiment disclosed may be made by persons skilled in the art without departing from the scope of the invention which is determined solely by the appended claims.

We claim:

1. A conveyor drive apparatus comprising in combination a flat conveyor movable along a straight line past a location at which it is driven and having an openwork configuration with longitudinally spaced rows of transversely spaced pockets providing drive surfaces, endless drive chain means mounted at said location and having a straight upper run codirectional with and spaced from said conveyor, means to drive said chain means, a substantial number of rods connected to said chain means for pivotal movement about their own axes and extending transversely of said conveyor at positions spaced longitudinally of said conveyor so that a plurality of rods is always positioned along said upper run, a plurality of pusher dogs connected to each of said rods and being spaced along each rod and between adjoining rods to correspond generally with the spacing between said pockets, said dogs being of a smaller size longitudinally of said conveyor than said pockets and extending outwardly from said rods for movement by said chain means upwardly into said pockets for travel therein along said upper run and then downwardly out of said pockets, cam follower means connected to said rods, and cam means mounted adjacent said upper run to engage said cam follower means to control the vertical and pivotal movement of said rods, said cam means having a surface configuration to hold each rod in a rearwardly rotated position with its dogs out of engagement with the corresponding drive surface while entering and leaving said pockets, said cam means having a further surface configuration to positively hold normally only one of said rods at a time in a forwardly rotated driving position with its dogs in driving engagement with their corresponding drive surfaces as said one rod passes a particular length along said upper run and to release the rods on both sides of said one rod for rearward rotation away from driving position so that said conveyor is driven along said upper run only at said particular length by the dogs of only one rod regardless of slight variations in the pitch of said drive surfaces, said cam means gradually releasing the driving rod for rearward rotation at the after end of said particular length as the next succeeding rod reaches said particular length to effect smooth transfer of driving to said next succeeding rod.

2. An apparatus as recited in claim 1 wherein said dogs have their driving surfaces inclined forwardly when in driving position to cam said conveyor inwardly and restrain it against separation from said dogs.

3. An apparatus as recited in claim 1 wherein said dogs have their drive surfaces located on said rods no further forward than the center lines of said rods.

4. A conveyor drive apparatus comprising in combination a flat conveyor movable in a straight line past a location at which it is driven and having an openwork configuration with longitudinally spaced rows of transversely spaced pockets providing drive surfaces, endless drive chain means mounted at said location and having an upper run codirectional with and spaced from said conveyor, means to drive said chain means, a substantial number of rods connected to said chain means for pivotal movement about their own axes and extending transversely of said conveyor at positions spaced longitudinally of said conveyor so that a plurality of rods is always positioned along said upper run, a plurality of pusher dogs connected to each of said rods and being spaced along each rod and between adjoining rods to correspond generally with the spacing between said pockets, said dogs being of a smaller size longitudinally of said conveyor than said pockets and extending outwardly from said rods for movement by said chain means upwardly into said pockets for travel therein along said upper run and then downwardly out of said pockets, first cam follower means connected to the ends of said rods and coaxial therewith, second cam follower means connected to said rods at positions spaced below and forwardly of said first cam follower means as said rods are moved along said upper run so that said second cam follower means may be moved to rotate said rods about said first cam follower means, cam means fixedly mounted to provide a first cam surface facing upwardly to support said first cam followers and said rods along said upper run with said dogs in said pockets and a second cam surface facing downwardly to engage said second cam followers to control the rotation of said rods, a particular length of said second cam surface being positioned to positively hold normally only one of said rods at a time in a forwardly rotated driving position with its dogs in driving engagement with their corresponding drive surfaces, said second cam surface being relieved at both ends of said particular length to release the rods on both sides of said one rod for rearward rotation away from driving position, said relief being gradual at the after end of said particular length to gradually release the driving rod for rearward rotation as the next succeeding rod reaches said particular length to effect smooth transfer of driving to said next succeeding rod.

5. An apparatus as recited in claim 4 wherein said first cam follower means has a path of movement directly above the path of movement of said second cam follower means and said first and second cam surfaces comprise opposite faces of a single member.

6. An apparatus as recited in claim 4 wherein said cam means includes upwardly facing cam surfaces adjacent the ends of said upper run to hold each rod in a rearwardly position with its dogs out of engagement with the corresponding drive surfaces while entering and leaving said pockets.

7. An apparatus as recited in claim 6 wherein the after end of said first cam surface is relieved to lower each roller as it is rotated rearwardly by said upwardly facing cam surface at the after end of said upper run to facilitate removal of the dogs from said pockets out of contact with their corresponding drive surfaces.

8. An apparatus as recited in claim 4 wherein said second cam surface maintains said dogs with their driving surfaces inclined forwardly when in driving position to cam said conveyor inwardly to restrain it against separation from said dogs.

9. An apparatus as recited in claim 8 wherein said first cam follower means has a path of movement directly above the path of movement of said second cam follower means and said first and second cam surfaces comprise opposite faces of a single member.

10. An apparatus as recited in claim 9 wherein said cam means provides upwardly facing cam surfaces adjacent the ends of said upper run to hold each rod in a rearwardly rotated position with its dogs out of engagement with the corresponding drive surfaces while entering and leaving said pockets.

11. An apparatus as recited in claim 10 wherein the after end of said first cam surface is relieved to lower each roller as it is rotated rearwardly by said upwardly facing cam surface at the after end of said upper run to facilitate removal of the dogs from said pockets out of contact with their drive surfaces.

No references cited.